No. 831,871. PATENTED SEPT. 25, 1906.
D. D. & W. D. JAMES.
STANCHION.
APPLICATION FILED DEC. 13, 1905.
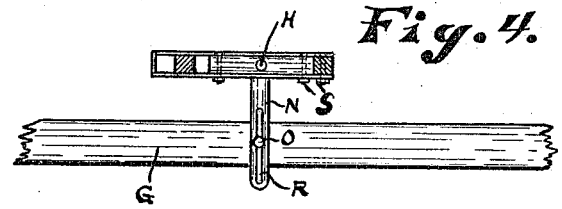
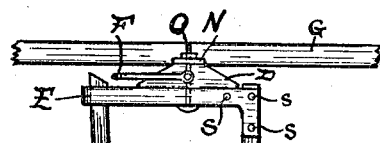
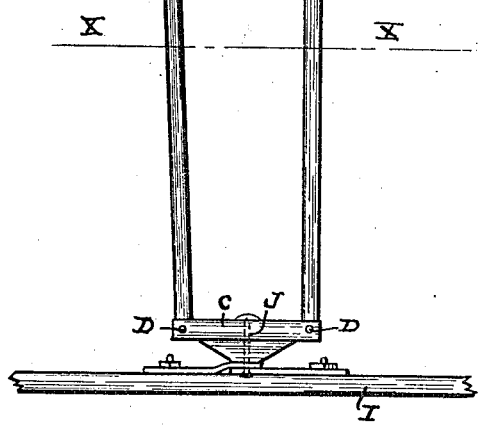
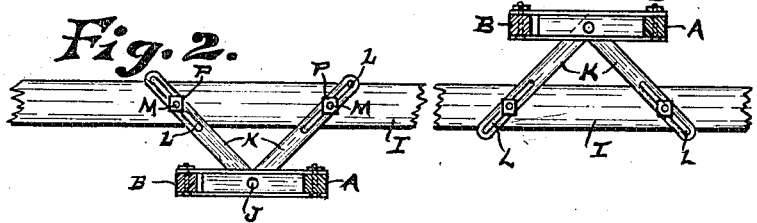
WITNESSES:
O. R. Erwin.
A. M. Schutz
INVENTORS
David D. James
William D. James
BY
Erwin Wheeler
ATTORNEYS

UNITED STATES PATENT OFFICE.

DAVID D. JAMES AND WILLIAM D. JAMES, OF DELAFIELD, WISCONSIN; SAID DAVID D. JAMES ASSIGNOR TO SAID WILLIAM D. JAMES.

STANCHION.

No. 831,871.      Specification of Letters Patent.      Patented Sept. 25, 1906.

Application filed December 13, 1905. Serial No. 291,519.

*To all whom it may concern:*

Be it known that we, DAVID D. JAMES and WILLIAM D. JAMES, citizens of the United States, residing at Delafield, county of Waukesha, and State of Wisconsin, have invented new and useful Improvements in Stanchions, of which the following is a specification.

Our invention relates to improvements in rigidly-adjustable stanchions.

It is a well-known fact that cattle vary in length according to age, breed, &c., and that the elevated platform or floors usually provided and upon which they stand are of uniform width throughout their length between the manger and the rear side and that it is desirable, for sanitary purposes, to so locate the stanchions that all the cattle in a stable will stand in the same relative position to the rear of the platform.

The object of our invention is therefore to provide a stanchion which may be adjusted forwardly or backwardly and rigidly secured in place either in front or rear of the manger proper or at any intermediate point between the extreme limits of its forward or backward adjustments to correspond with the length of the animals secured therein, whereby when all the stanchions in a stable have once been adjusted to correspond with the length of the respective animals retained therein all the animals in the stable will stand in the same relative position to the rear edge of the platform.

The construction of our invention is explained by reference to the accompanying drawings, in which—

Figure 1 represents a front view of one of a series of stanchions embodying our improvements. Figs. 2 and 3 are transverse sections drawn on line *x x* of Fig. 1, showing the device for adjusting and holding the lower end of the stanchion in two different positions both in front and rear of the manger; and Fig. 4 represents a transverse section of a stanchion inverted so as to see the lower side of the upper end thereof.

Like parts are identified by the same reference-letters throughout the several views.

Our stanchion comprises, among other things, a stationary standard A, pivotal standard B, lower revoluble block C, upper revoluble block D, stationary bracket E, and pivotal locking-loop F. The upper revoluble block D is connected with the upper retaining-bar G through the bolt H, slotted link N, and link-retaining bolt O. The lower block C is connected with the lower retaining-bar I by the pivotal bolt J, links K K, provided with slots L L, and link-retaining bolts M M. Thus it will be obvious that when desirous to adjust the stanchions forwardly or backwardly relatively to its retaining-bars this object is accomplished by first loosening the nuts P on the bolts M, when said stanchion may be adjusted in front or rear of the bar I or at any intermediate point between the extreme limits of such adjustments desired, when the stanchions may be permanently locked at such point of adjustment by turning down said nuts P on the bolts M, whereby the stanchion-supporting links K will be rigidly locked in place.

It will of course be understood that the slots L are formed in the links K for the reception of the fastening-bolts M and that such slots permit of the forward and backward adjustment of the stanchions at any desired point corresponding with the length of said slots.

It will also be understood that the upper end of the stanchions may be adjusted forwardly or backwardly at any desired point in front of the bar G, corresponding with the length of the slot R, which is formed in the link N for the reception of the retaining-bolt O. Bracket E serves as a guide for the pivotal standard B and limits the movement of its upper end toward the right and left. The loop F serves to lock the standard B in its closed position. Bracket E is rigidly secured in place in connection with the block D and standard A by the bolts S.

Having thus described our invention, what we claim as new, and desire to secure by Letters Patent, is—

1. In a device of the described class the combination with the lower end of a revoluble stanchion, of a stanchion-supporting bearing, stanchion-retaining bars and links provided with longitudinal slots and bolts for rigidly supporting said stanchion at any desired point of adjustment relatively to such retaining-bars corresponding with the length of said links and the longitudinal slots formed therein.

2. In a device of the described class the combination with the lower end of a revoluble stanchion-supporting bearing, a stanchion-retaining bar, of two links respectively pivotally connected at their converging ends with said bearing and at their diverging ends with said bar, link-retaining bolts rigidly connected at one end with said bar and adjustably connected at their opposite ends with said links, said bolts being adapted to lock said links at any desired point of adjustment relatively to said bar, substantially as set forth.

3. In a device of the described class the combination with the respective upper and lower ends of a revoluble stanchion, of stanchion-supporting bearings and stanchion-retaining bars and means for adjusting and rigidly locking the respective upper and lower ends of said stanchion forwardly or backwardly relatively to said stanchion-retaining bars, all substantially as and for the purpose specified.

In testimony whereof we affix our signatures in the presence of two witnesses.

DAVID D. JAMES.
WILLIAM D. JAMES.

Witnesses:
O. R. ERWIN,
LEVERETT C. WHEELER.